(No Model.)
T. J. McBRIDE
CULTIVATOR.
No. 517,962. Patented Apr. 10, 1894.
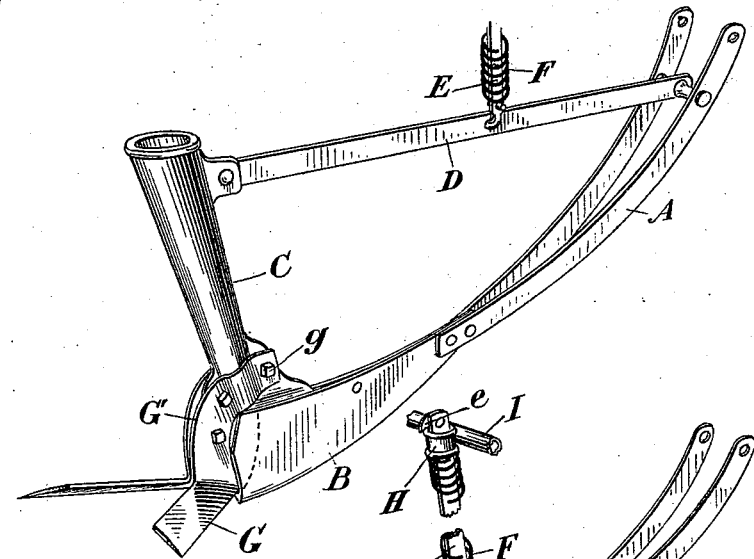
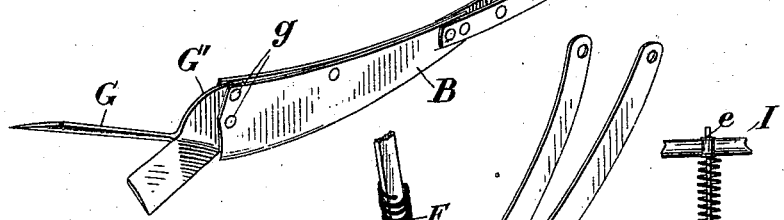
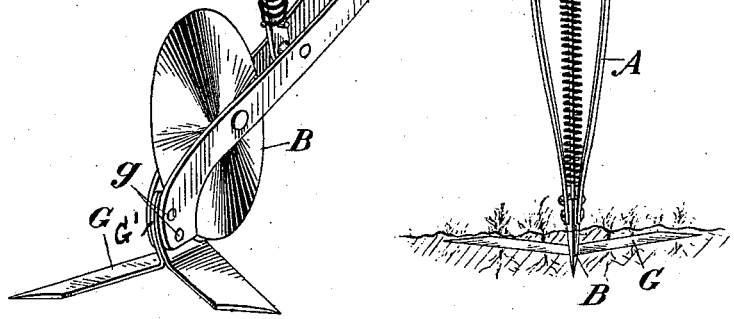
Witnesses.
Inventor.
T. J. McBride
by Fetherstonhaugh & Co
Attys

UNITED STATES PATENT OFFICE.

THOMAS JAMES McBRIDE, OF WINNIPEG, MANITOBA, ASSIGNOR TO THE MASSEY-HARRIS COMPANY, OF TORONTO, CANADA.

CULTIVATOR.

SPECIFICATION forming part of Letters Patent No. 517,962, dated April 10, 1894.

Application filed November 24, 1893. Serial No. 491,840. (No model.)

*To all whom it may concern:*

Be it known that I, THOMAS JAMES MC-BRIDE, of the city of Winnipeg, in the county of Selkirk, in the Province of Manitoba, Canada, have invented certain new and useful Improvements in Cultivators, of which the following is a specification.

My invention relates to improvements in cultivators or seeding machines and consists in the devices and combination of devices hereinafter fully set forth and particularly claimed.

In the accompanying drawings—Figure 1 is a perspective view of a drag bar, shoe and conveyer tube of an ordinary shoe drill with my weed cutter attached. Fig. 2, is a perspective view of the drag bar, shoe and weed cutter attached to the shoe as it would appear if the machine was specially constructed for cutting weeds. Fig. 3, is a view of an alternative form showing the drag bar with colter wheel instead of shoe, with weed cutter secured at the rear end of the drag bars. Fig. 4, is an end view from the front of Fig. 2, showing the position of the weed cutter as it passes along beneath the surface of the soil.

In the drawings like letters of reference indicate corresponding parts in each figure.

A, is the drag bar, which is suitably connected to the front bar of the machine.

B, is the shoe connected to the rear end of the drag bar. The shoe, B, is constructed in cross section in the form of an elongated U from the top to the bottom, the base of the U coming to a point or cutting edge. This is the form used in one class of shoe drills.

In Fig. 1, I show the bottom of the tube, C, secured between the sides of elongated shoe. The tube, C, is connected by the bar D, to the drag bar, A. The bar, D, has connected to it the rod, E, which is surrounded by a spring, F, which is designed for the purpose of keeping the pressure upon the shoe as will be seen on reference to Fig. 2.

G, are laterally extending knives the cutting edges of which are situated next the shoe. The knives, G, preferably extend back on each side at an obtuse angle to the length of the shoe and rise slightly obliquely from inside to outside as indicated in Fig. 4, and from front to rear.

In Fig. 1, it will be seen that the knives are attached to the tube by means of the curved upward extensions, G', through which are passed the bolts, g.

In Fig. 2, the knives, G, are formed integral with a curved upward extension, G', which extends in between the sides of the elongated U-shaped shoe and is rigidly secured therein by the bolts, g.

In Fig. 3, the curved upward extension, G', of the knives, G, is secured by bolts, g, in the ends of the drag bar behind the colter wheel, B, which in this instance is the equivalent and performs the same function as the shoe, B. The pressure is exerted upon the shoe or colter wheel in each instance in the manner shown in Fig. 2, in which the bar, E, is pivotally connected at the bottom end within the drag bar and extends up through a socket, H, attached to the pressure bar, I. The spring, F, on the rod, E, extends between the bottom end of the socket, H, and the cross pin, J, passing through the bar, E. The bar, E, is provided with a stop pin, or bolt, e, at the top to prevent it from coming out of the socket, H, and is longitudinally adjustable within the socket, H. The pressure necessary for keeping the shoe well into the ground is exerted through the spring, F, on each of the drag bars, which in some shoe drills are arranged across the machine. The degree of pressure necessary to be exerted upon the shoe for different classes of soil is obtained by a lever (not shown) which regulates the vertical position of the pressure bar, I, but as this lever and the means by which the pressure bar is held, forms no feature in my invention I do not describe them.

I am aware that weed cutters have been formerly employed in connection with independently working spring cultivator teeth but where secured to such teeth the weed cutter would wabble and instead of performing its work frequently pass the weeds, which lie in its path.

I am also aware that a weed cutter has been employed in connection with rigid teeth all co-acting together but incapable of separate movement. In such case, however, all the teeth maintain the same level and as a consequence the weed cutter attached to some of the teeth would entirely pass over the weeds and leave them uncut. By my device, however, the cutting edge of the shoe of each drag bar is caused to extend downwardly beneath the surface of the ground in its forward movement and thus serves to prevent any wabbling whatever of the weed cutting knives, G, as they pass along beneath the surface of the ground, thereby insuring the cutting of all weeds which lie in their path. As each cutter attached to its shoe and drag bar is independently controlled it will be understood that the weeds in uneven ground will be as effectively cut as when the ground is level.

What I claim as my invention is—

1. In a cultivator or seeding machine having a series of independent drag bars and shoes attached thereto, the combination with the drag bar, and shoe having a sharp bottom cutting edge, of a weed cutter composed of two laterally extending knives attached to the rear of the shoe as and for the purpose specified.

2. In a cultivator or seeding machine having a series of independent drag bars and shoes attached thereto, the combination with the drag bar and shoe having a sharp bottom edge, of a weed cutter composed of two laterally extending knives preferably slanting slightly upwardly toward their outer ends and to the rear, the cutting edges of the knives being preferably situated at an obtuse angle to the side of the shoe and the knives being secured to the rear end of the shoe through their upward extensions G', which are held between the sides of the shoe as and for the purpose specified.

3. In a cultivator or seeding machine having a series of independent drag bars and shoes attached thereto, the combination with the drag bar and shoe having a sharp bottom cutting edge, of a weed cutter, G, secured to the rear end of the shoe and means whereby a pressure is exerted upon the shoe so as to maintain the bottom of the shoe, as it moves forward, at a uniform depth in the ground as and for the purpose specified.

4. In a cultivator or seeding machine having a series of independent drag bars and shoes attached thereto, the combination with the drag bar and shoe having a sharp bottom cutting edge, of a weed cutter, G, secured to the rear end of the shoe, the bar E, pivotally connected within the drag bar and extending through the socket, H, attached to the pressure bar and the spring, F, located on the bar, E, as and for the purpose specified.

THOMAS JAMES McBRIDE.

Witnesses:
R. H. AGUR,
H. J. EBERTS.